United States Patent
Uimonen et al.

(10) Patent No.: US 11,299,226 B2
(45) Date of Patent: Apr. 12, 2022

(54) BICYCLE

(71) Applicant: MOBILITY HOLDINGS, LIMITED, Causeway Bay (HK)

(72) Inventors: Joakim Uimonen, Causeway Bay (HK); Eric Yi-Hung Lin, Causeway Bay (HK); Chao-Liang Hsu, Causeway Bay (HK); Joshua Hon, Causeway Bay (HK); Matthew Lawrence Davis, Causeway Bay (HK)

(73) Assignee: Mobility Holdings, Ltd., Hong Kong (HK)

( * ) Notice: Subject to any disclaimer, the term of this patent is extended or adjusted under 35 U.S.C. 154(b) by 103 days.

(21) Appl. No.: 16/987,575

(22) Filed: Aug. 7, 2020

(65) Prior Publication Data

US 2022/0041238 A1 Feb. 10, 2022

(51) Int. Cl.
*B62J 9/23* (2020.01)
*B62J 7/04* (2006.01)

(52) U.S. Cl.
CPC .. *B62J 9/23* (2020.02); *B62J 7/04* (2013.01)

(58) Field of Classification Search
CPC ......... B62J 7/04; B62J 9/00; B62J 9/23; B62J 9/20; B62J 9/40; B62J 11/22
See application file for complete search history.

(56) References Cited

U.S. PATENT DOCUMENTS

| | | | | |
|---|---|---|---|---|
| 5,687,894 | A * | 11/1997 | Cavallaro | B62J 11/00 224/457 |
| 7,341,270 | B1 * | 3/2008 | Scholz | B62J 7/04 224/432 |
| D906,183 | S * | 12/2020 | Uimonen | D12/111 |
| D919,483 | S * | 5/2021 | Uimonen | D12/111 |
| 11,186,335 | B1 * | 11/2021 | Uimonen | B62H 1/02 |
| 2012/0056399 | A1 * | 3/2012 | Hon | B62K 15/008 280/278 |
| 2018/0339740 | A1 * | 11/2018 | Getchell | B62J 1/28 |
| 2021/0339813 | A1 * | 11/2021 | Ledingham | B62J 9/24 |

* cited by examiner

*Primary Examiner* — Corey N Skurdal

(57) ABSTRACT

The bicycle which includes a rear wheel and a frame is disclosed. The frame includes a frame main body and two first supporting platforms. The frame main body includes two supporting parts, a bottom frame and a surrounding part. The two supporting parts are respectively located on the two sides of the rear wheel. The bottom frame is located in front of the rear wheel. The surrounding part is located in back of the rear wheel. The two first supporting platforms are respectively located on the two sides of the rear wheel. Each of the two first supporting platforms includes a side plate and a top plate. The side plate includes a front connecting end and a back connecting end.

14 Claims, 11 Drawing Sheets

BICYCLE

BACKGROUND OF THE INVENTION

1. Field of the Invention

The present invention relates to the bicycle: more particularly, the present invention relates to a bicycle which can carry multiple items conveniently.

2. Description of the Related Art

The bicycle is a very convenient and environmentally friendly mode of transportation for a user to ride to the user's destination. To facilitate the transportation of items, the bicycle may have a basket mounted in front of the handlebars; thus, when riding the bicycle, the user can put items in the basket.

However, because the containing space of the basket is limited, the basket cannot hold an item which is too large. Therefore, there is a need to provide a new bicycle which can carry multiple items conveniently.

SUMMARY OF THE INVENTION

The object of the present invention is to provide a bicycle which can carry multiple items conveniently.

To achieve the abovementioned object, a bicycle of the present invention includes a rear wheel and a frame. The frame includes a frame main body and two first supporting platforms. The frame main body is connected to the bicycle. The frame main body includes two supporting parts, a bottom frame and a surrounding part. The two supporting parts are respectively located on the two sides of the rear wheel. The bottom frame is located in front of the rear wheel. The surrounding part is located in back of the rear wheel. The two first supporting platforms are respectively located on the two sides of the rear wheel. Each of the two first supporting platforms includes a side plate and a top plate. The side plate includes a front connecting end and a back connecting end. The front connecting end is connected to the bottom frame, and the back connecting end is connected to the supporting part located on the same side of the rear wheel. The top plate is connected to the top of the side plate, and the top plate includes a first supporting surface to support an external object.

According to one embodiment of the present invention, the two first supporting platforms each include a bottom connecting plate, and the bottom connecting plate is connected to the front connecting end of the side plate of the two first supporting platforms.

According to one embodiment of the present invention, the two first supporting platforms each include a connecting block, and the connecting block is connected to the side plate located on the same side of the rear wheel.

According to one embodiment of the present invention, the bicycle further includes a kickstand, and the top plate further includes at least one top plate hole. The kickstand is fastened to the top plate hole.

According to one embodiment of the present invention, the two first supporting platforms each include an extension supporting plate. The extension supporting plate includes a fastener. The side plates of the two first supporting platforms each include a fixing part. The fastener is fastened to the fixing part.

According to one embodiment of the present invention, the frame further includes a second supporting platform and a storage bag, wherein the second supporting platform is located above the rear wheel. The second supporting platform further includes a storage bag stand, and the storage bag stand further includes a top frame. The storage bag includes a top bag body. The top bag body is located on the top frame.

According to one embodiment of the present invention, the storage bag further includes two side bag bodies, and the two side bag bodies are connected to the top bag body, respectively located on the two sides of the rear wheel, and supported on the two first supporting platforms.

According to one embodiment of the present invention, the top bag body further includes at least one first connecting sheet. The two side bag bodies each include at least one second connecting sheet. The first connecting sheet and the second connecting sheet of the two side bag bodies are combined with each other to form a connecting bag body, and the connecting bag body is located on the second supporting platform.

According to one embodiment of the present invention, the two side bag bodies each include an opening part and a fastening belt; the opening part is located next to the second connecting sheet, and the fastening belt is fastened to the first supporting platform.

DETAILED DESCRIPTION OF THE PREFERRED EMBODIMENT

Figure 1:
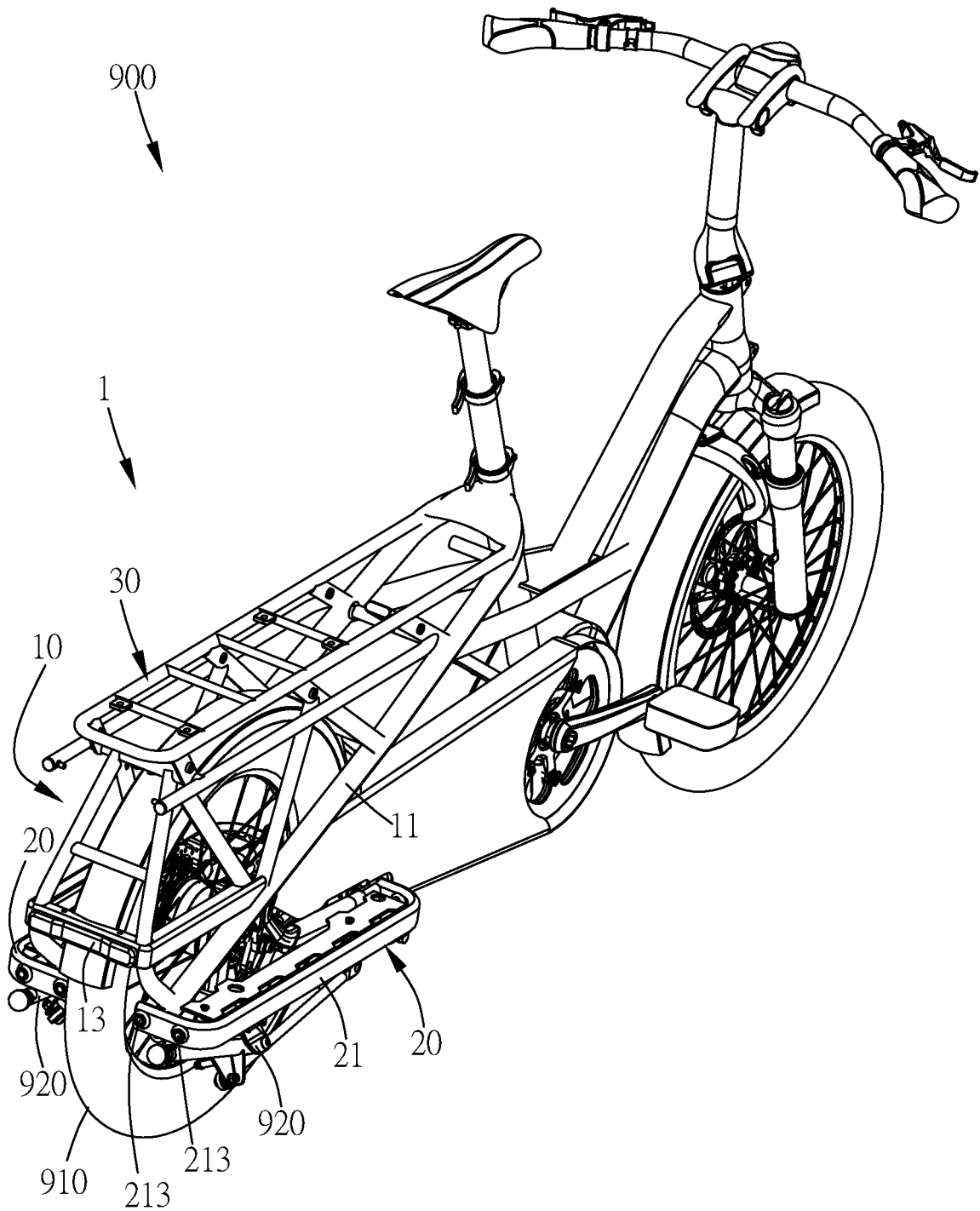
FIG. 1 illustrates a schematic drawing of the bicycle in the first embodiment of the present invention.
Figure 2:
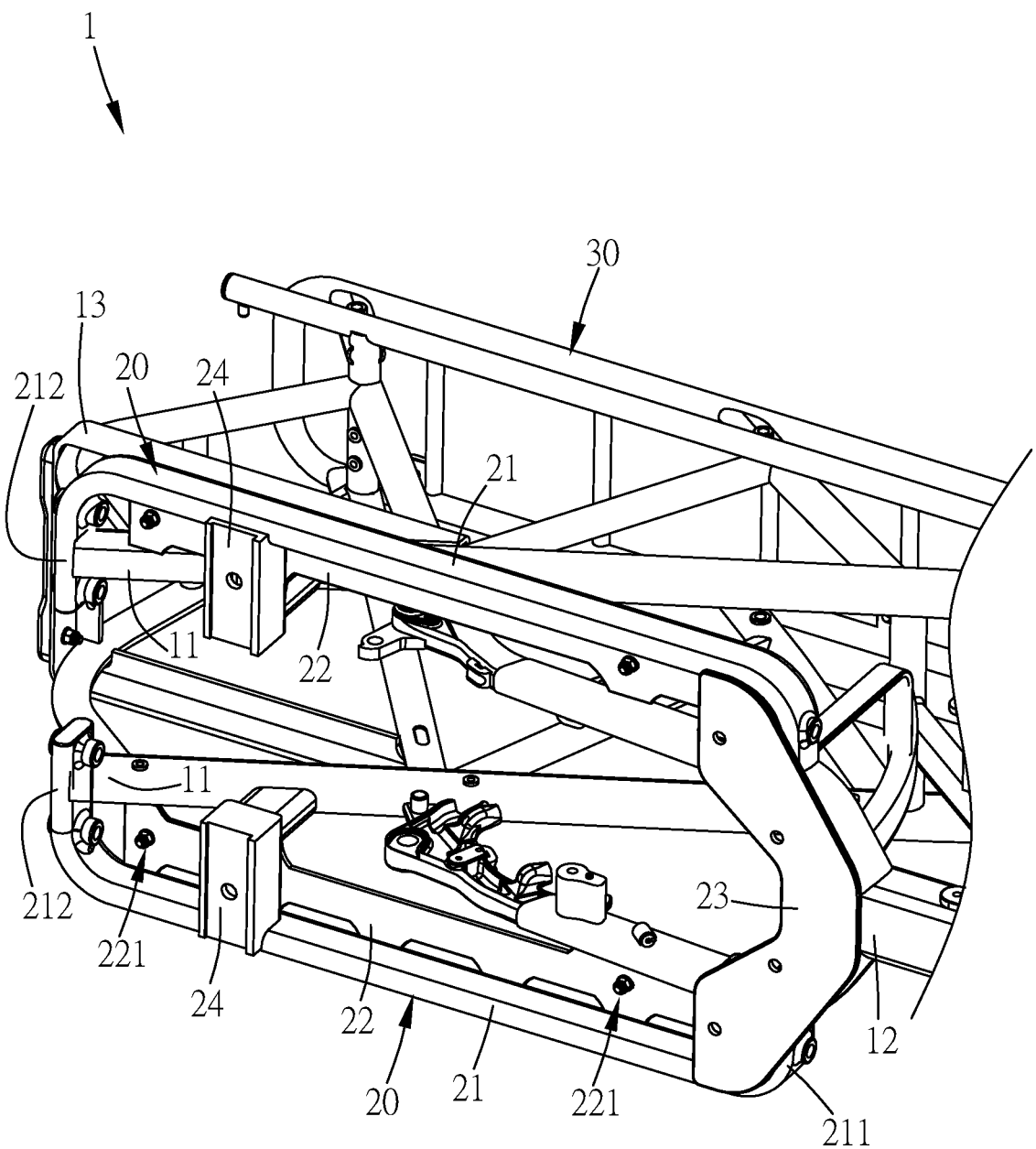
FIG. 2 illustrates a bottom schematic drawing of the frame in the first embodiment of the present invention.
Figure 3:
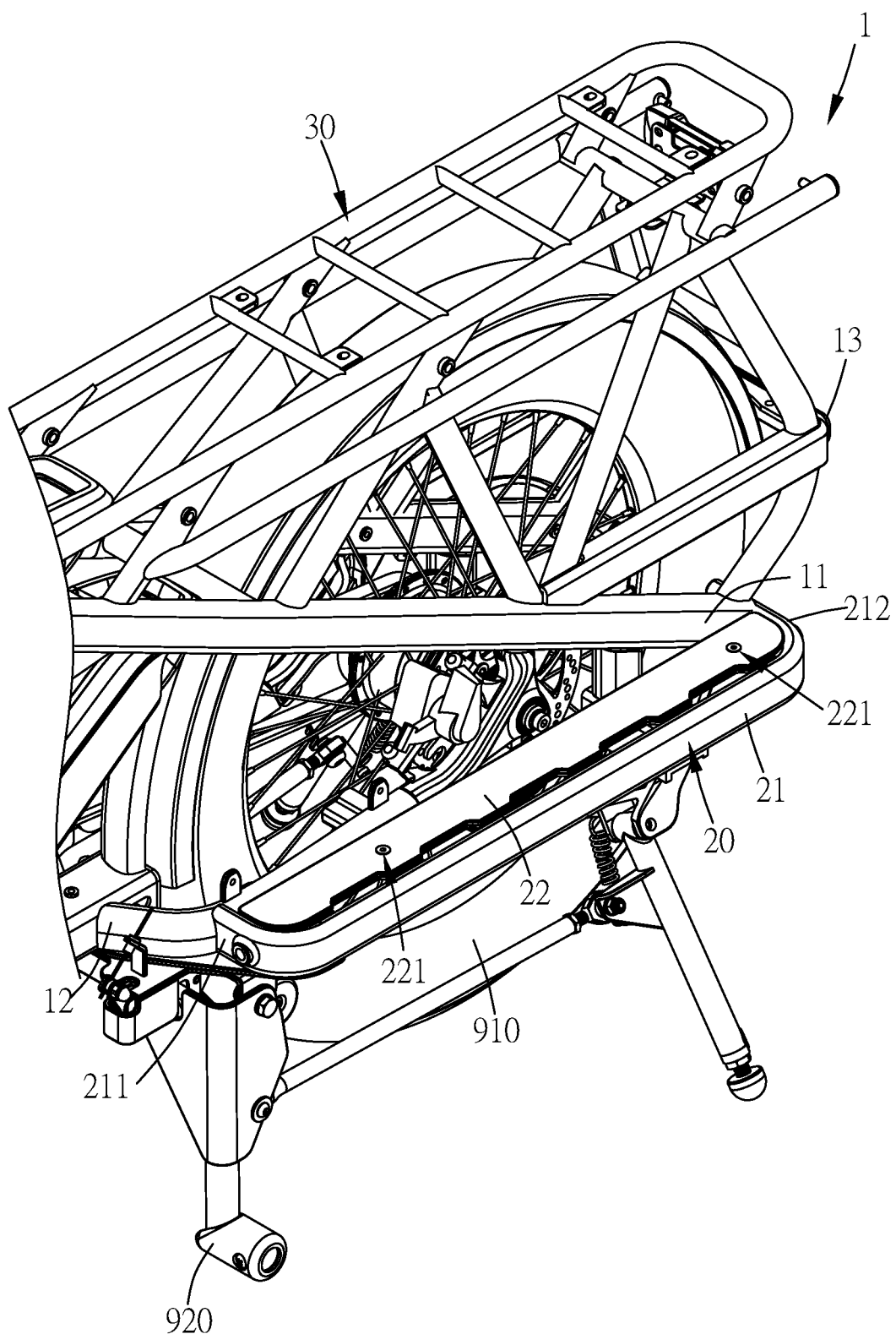
FIG. 3 illustrates a partial schematic drawing of the frame and the bicycle in the first embodiment of the present invention.

Please refer to FIG. 1 to FIG. 3, which illustrate the bicycle and the frame in the first embodiment of the present invention. FIG. 1 illustrates a schematic drawing of the bicycle in the first embodiment of the present invention. FIG. 2 illustrates a bottom schematic drawing of the frame in the first embodiment of the present invention. FIG. 3 illustrates a partial schematic drawing of the frame and the bicycle in the first embodiment of the present invention.

As shown in FIG. 1, in the first embodiment of the present invention, the bicycle 900 provides convenience to a user transporting multiple items. The bicycle 900 includes a rear wheel 910, a kickstand 920 and a frame 1. The rear wheel 910 is a wheel located in the back end of the bicycle 900. The kickstand 920 is connected to the frame 1. The kickstand 920 is used for allowing the bicycle 900 to stand when parked. The frame 1 is used for carrying multiple items and for installing other bicycle accessories. The frame 1 includes a frame main body 10, two first supporting platforms 20 and a second supporting platform 30.

As shown in FIG. 2, in the first embodiment of the present invention, the frame main body 10 is the frame structure that forms the body of the bicycle 100. The frame main body 10 includes two supporting parts 11, a bottom frame 12 and a surrounding part 13. The two supporting parts 11 are two bevel bars respectively located on the left and right sides of the rear wheel 910. The bottom frame 12 is a Y-shaped frame body located in front of the rear wheel 910. The surrounding part 13 is located in back of the rear wheel 910 and connected to the two supporting parts 11.

As shown in FIG. 1 and FIG. 2, in the first embodiment of the present invention, the two first supporting platforms 20 are respectively located on the left and right sides of the rear wheel 910, and the first supporting platforms 20 are used for supporting external objects or installing other bicycle accessories. Each of the two first supporting platforms 20 includes a side plate 21, a top plate 22, a bottom connecting plate 23 and a connecting block 24. The side plate 21 is a C-shaped plate body. The side plate 21 includes a front connecting end 211, a back connecting end 212 and two fixing parts 213. The front connecting end 211 is connected to the bottom frame 12. The back connecting end 212 is connected to the supporting part 11 located on the same side of the rear wheel 910. The fixing part 213 is a screw hole for installing other bicycle accessories, but the amount of the fixing parts 213 is not limited to two and can be changed to at least one to meet design requirements.

The top plate 22 is connected to the top of the side plate 21, and the top plate 22 includes a first supporting surface to support an external object. Each top plate 22 includes two top plate holes 221. The top plate hole 22 is used for installing other bicycle accessories via a screw and a nut. For example, the kickstand 920 can be fastened to the top plate hole 221 but the amount of top plate holes 221 is not limited to two and can be changed to at least one to meet design requirements. The bottom connecting plate 23 is a V-shaped plate body. The bottom connecting plate 23 is connected to the front connecting end 211 of the side plate 21 of the two first supporting platforms 20. The connecting block 24 is connected to the side plate 21 on the same side of the rear wheel 910 and used for enhancing the structural strength of the first supporting platform 20. The connecting block 24 includes a hole, and the hole can be used for installing other bicycle accessories via a screw and a nut.

In the first embodiment of the present invention, the second supporting platform 30 is located above the rear wheel 910. The second supporting platform 30 is used for allowing the user to tie an external object to the second supporting platform 30 to support the external object.

As shown in FIG. 1 and FIG. 3, in the first embodiment of the present invention, when the user needs to use the frame 1 to support an external object, the user can put the external object on the top plate 22 or on the second supporting platform 30 and use a cord to tie the external object to the supporting part 11, the top plate 22 or the second supporting platform 30 such that the external object can be supported and carried smoothly. In addition, the two supporting parts 11 can prevent the external object on the first supporting platform 20 from being drawn into the rear wheel 910 to increase the safety when riding the bicycle 900.

If the user wants to install additional bicycle accessories (such as a light or a water bottle holder) to the frame 1, the user can use a screw and a nut to install the additional bicycle accessory to the top plate hole 221 of the top plate 22.

Figure 4:
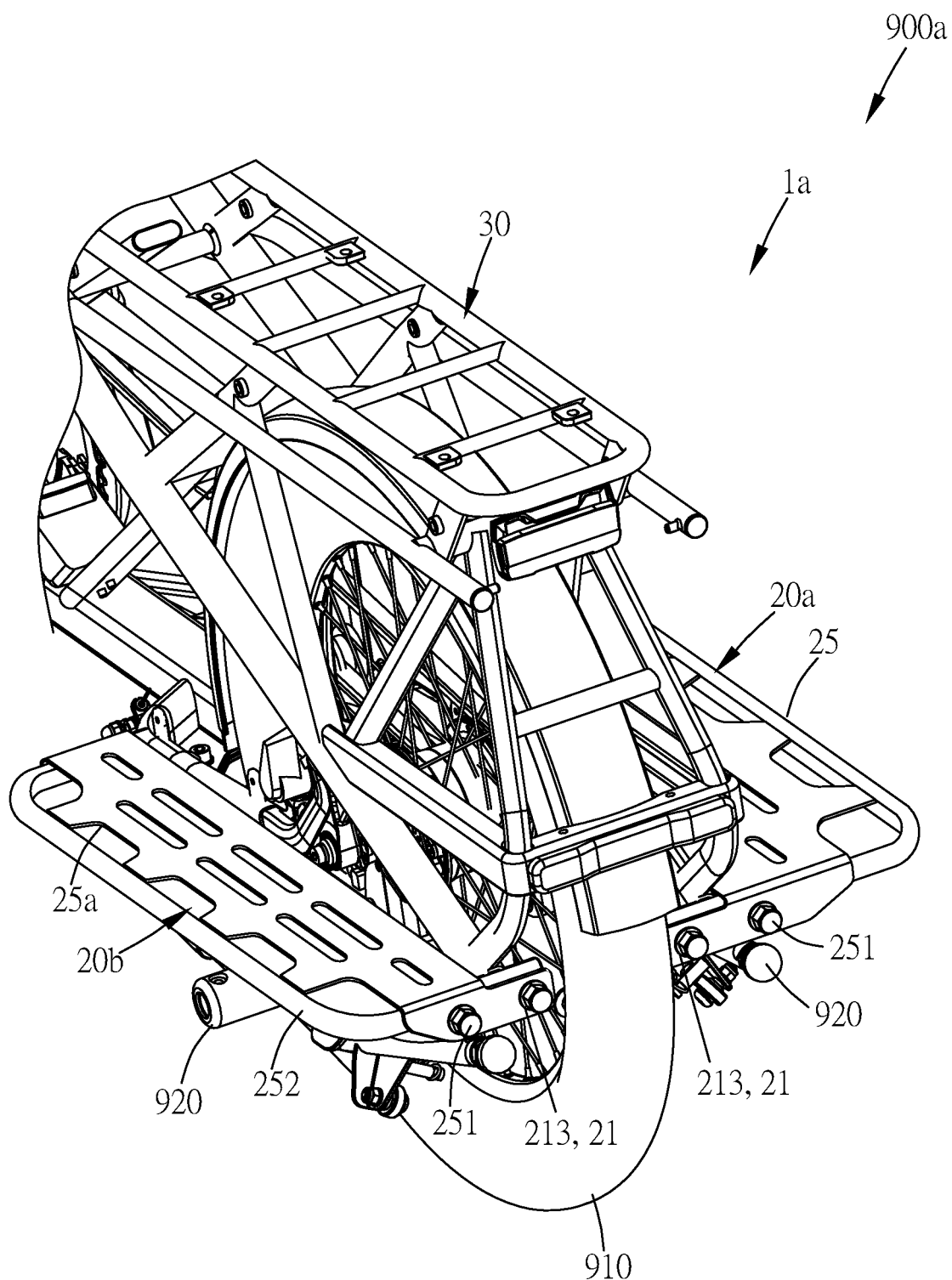
FIG. 4 illustrates a partial schematic drawing of the frame and the bicycle in the second embodiment of the present invention.
Figure 4A:
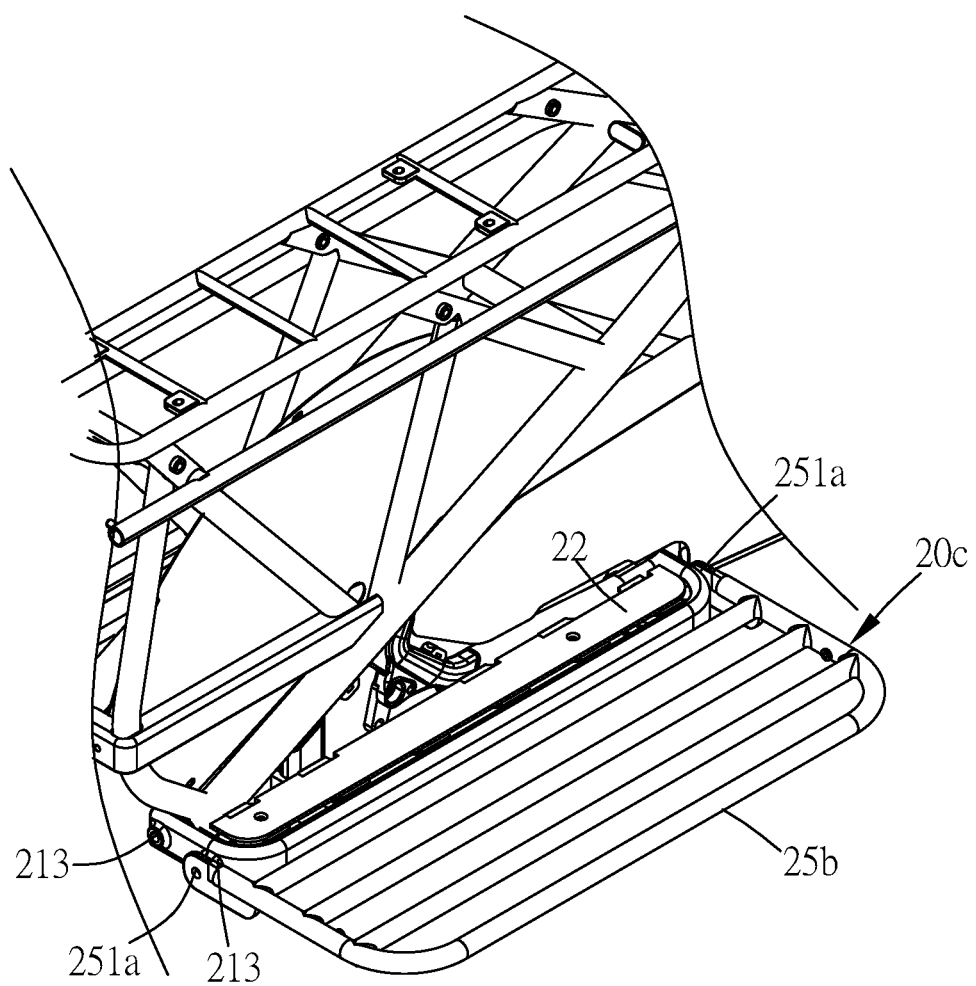
FIG. 4A illustrates a partial schematic drawing of the other kind of the opening first supporting platform in the second embodiment of the present invention.
Figure 4B:
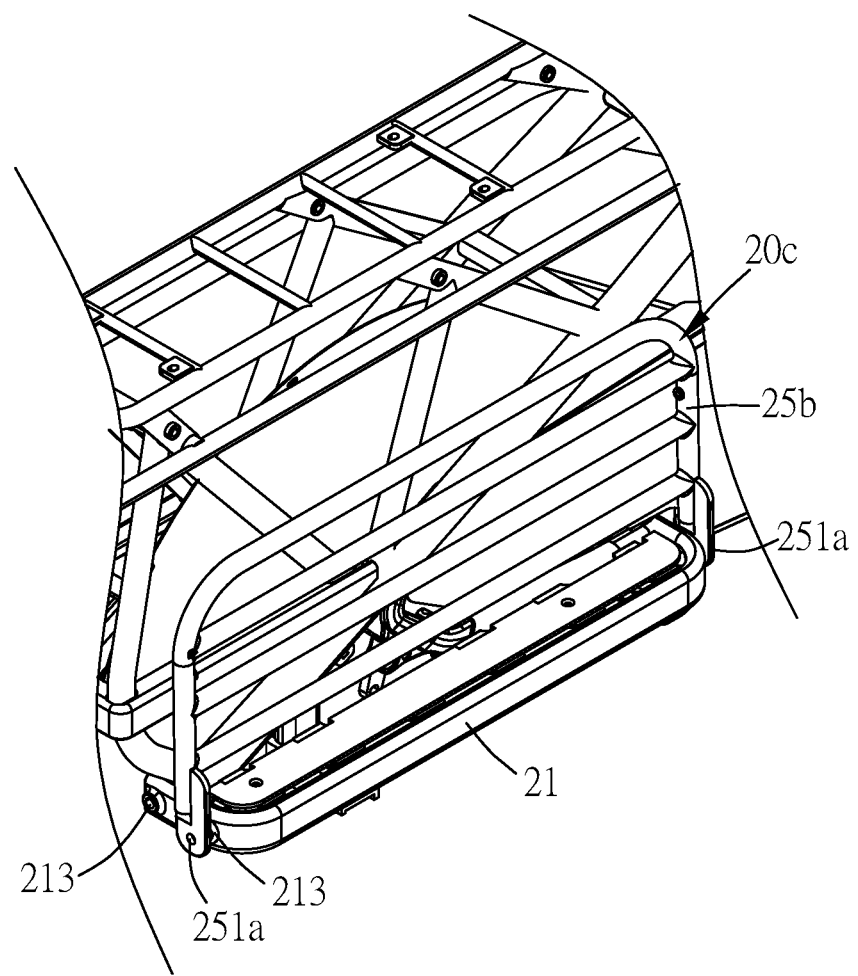
FIG. 4B illustrates a partial schematic drawing of the other kind of the closing first supporting platform in the second embodiment of the present invention.

Please refer to FIG. 4, FIG. 4A and FIG. 4B, which illustrate the bicycle and the frame in the second embodiment of the present invention. FIG. 4 illustrates a partial schematic drawing of the frame and the bicycle in the second embodiment of the present invention. FIG. 4A illustrates a partial schematic drawing of the other kind of the opening first supporting platform in the second embodiment of the present invention. FIG. 4B illustrates a partial schematic drawing of the other kind of the closing first supporting platform in the second embodiment of the present invention.

As shown in FIG. 4, the difference between the second embodiment and the first embodiment of the present invention is that, in the frame 1a of the bicycle 900a of the second embodiment, the two first supporting platforms 20a, 20b each include extension supporting plates 25, 25a. The two extension supporting plates 25, 25a have different widths to provide supporting surfaces of different sizes. The two extension supporting plates 25, 25a each include three fasteners 251, one (not shown in the figure) of the fasteners 251 is located on the front side of the extension supporting plates 25, 25a, and the other two fasteners 251 are located on the back side of the extension supporting plates 25, 25a; the fastener 251 is a screw for fastening the screw hole of the fixing part 213 of the side plate 21 such that the two extension supporting plates 25, 25a respectively combine with the two side plates 21. Therefore, the two extension supporting plates 25, 25a can provide a larger supporting surface to support the external object. Furthermore, the supporting plates 25, 25a both includes a side tube 252 which has the curved corner, and the curved corner is used for preventing to harm the rider's leg when the rider pushes the bicycle 900a.

However, the design of the two extension supporting plates 25, 25a are not limited to the abovementioned design; for example, as shown in FIG. 4A and FIG. 4B, in the extension supporting plate 25b of the first supporting platforms 20c, the fastener 251a can be pivotally connection sheet, the amount of the fastener 251a can be two, and the two fastener are along the same axis, such that the two fasteners 251a and the corresponding fixing parts 213 can form a rotation axis, and the extension supporting plate 25b can rotate to be folded along the rotation axis, such that the overall volume of the bicycle can be reduced. Furthermore, the two extension supporting plates can be designed to have the same shape and width, for example, the extension supporting plate 25 can be designed to be the same as the extension supporting plate 25a. Furthermore, the extension supporting plate 25, 25a can be designed to have additional connection belt or connection bar (not shown in the figure), the connection belt or connection bar is connected to the extension supporting plate and the second supporting platform 30, allowing the extension supporting plate 25, 25a to support the external object more stably.

When the user does not need to use the extension supporting plates 25, 25a to support an external object, the user can separate the fastener 251 of the extension supporting plates 25, 25a and the fixing part 213 of the side plate 21, and then the user can tie the extension supporting plates 25, 25a to the second supporting platform 30 with a cord or belt to store the extension supporting plates 25, 25a.

Figure 5:
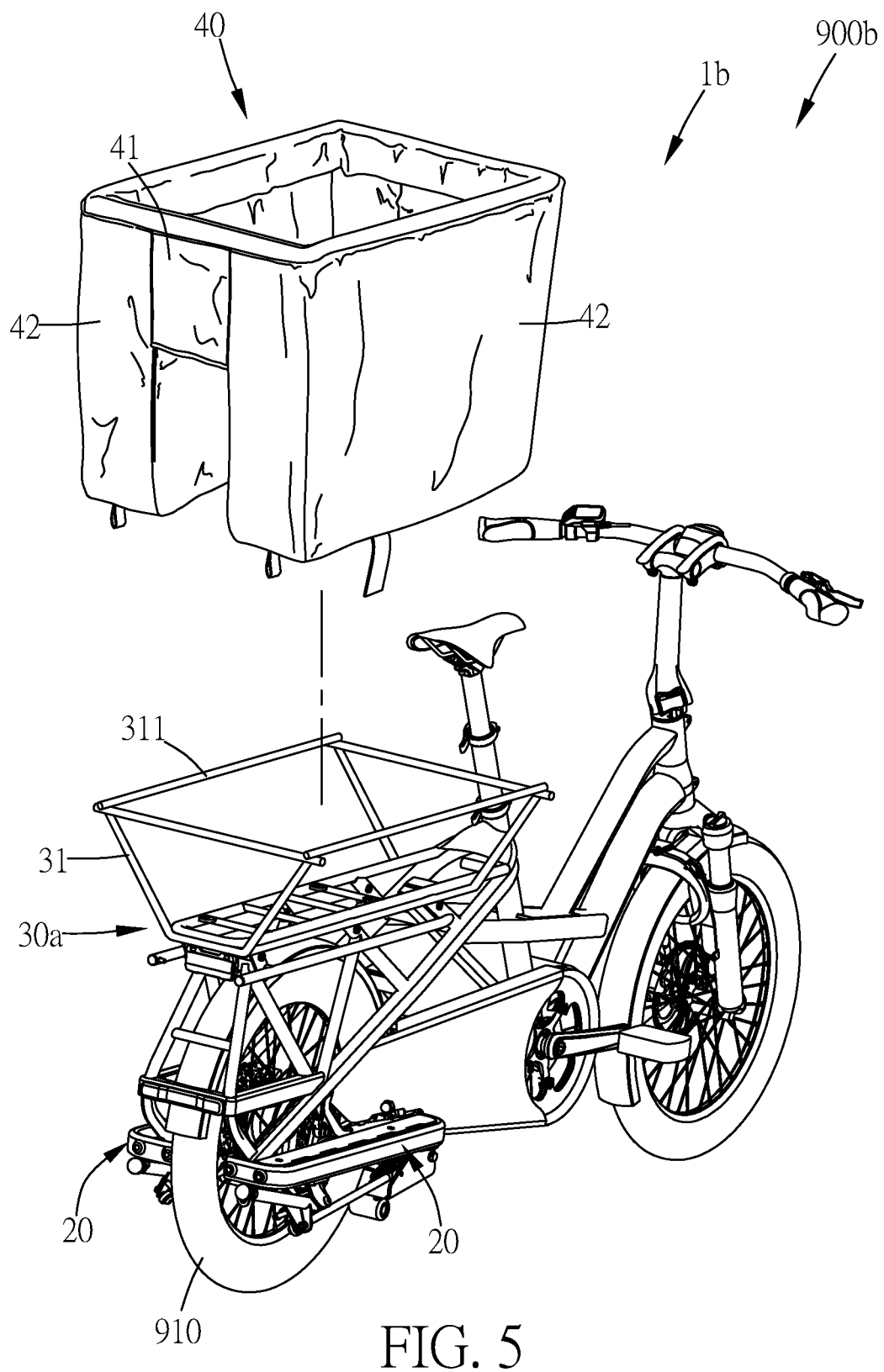
FIG. 5 illustrates a schematic drawing of the bicycle with the separate storage bag and second supporting platform in the third embodiment of the present invention.
Figure 6:
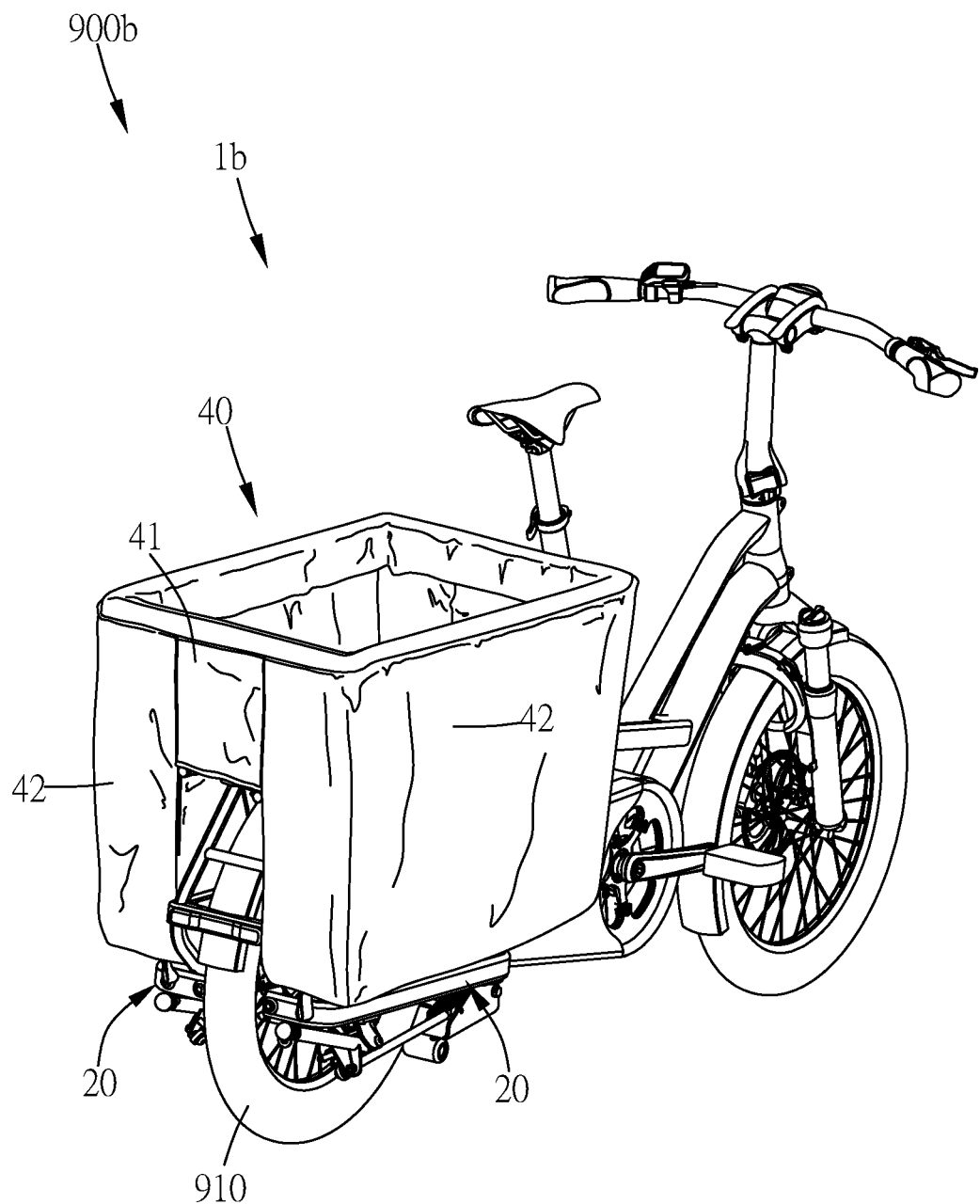
FIG. 6 illustrates a schematic drawing of the bicycle with the storage bag placed on the second supporting platform in the third embodiment of the present invention.
Figure 7:
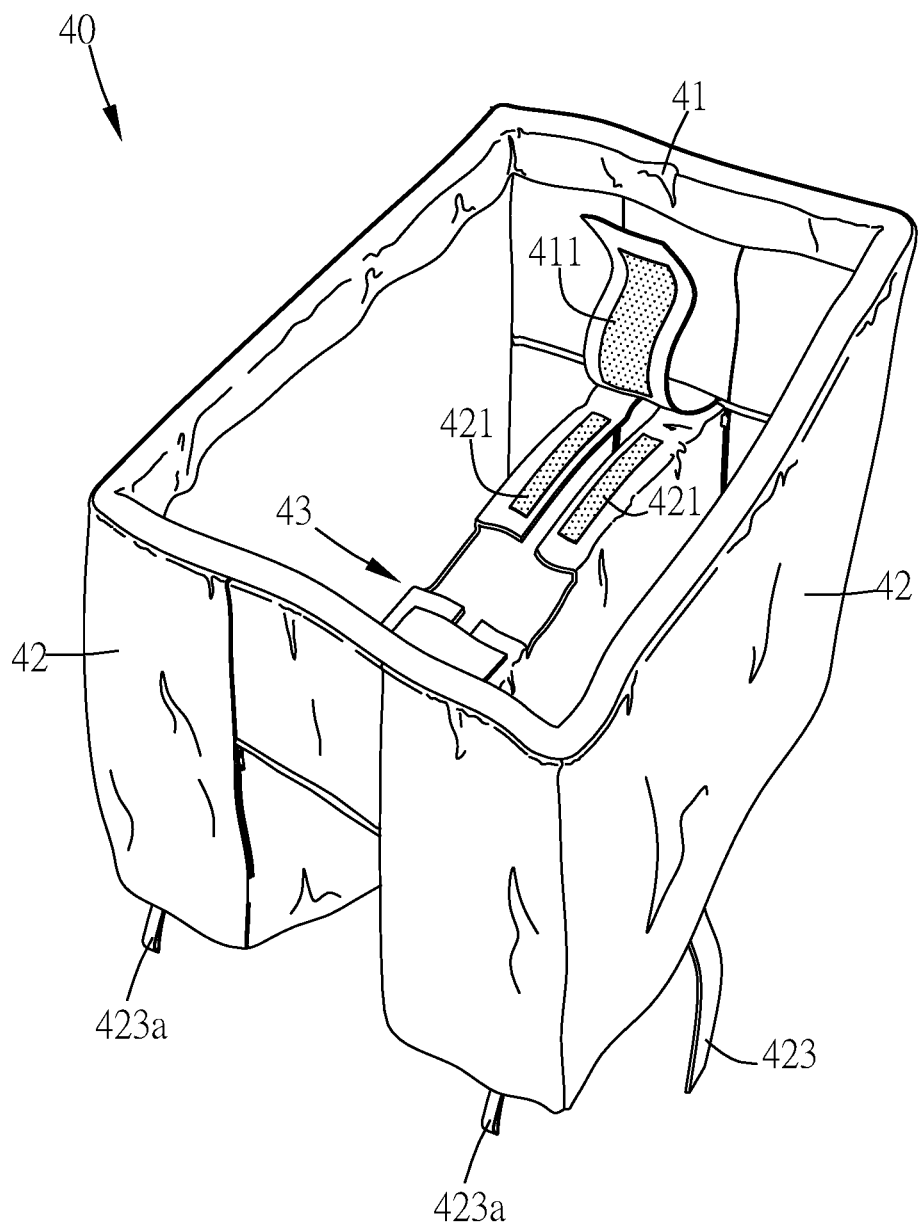
FIG. 7 illustrates a schematic drawing of the storage bag in the third embodiment of the present invention.
Figure 8:
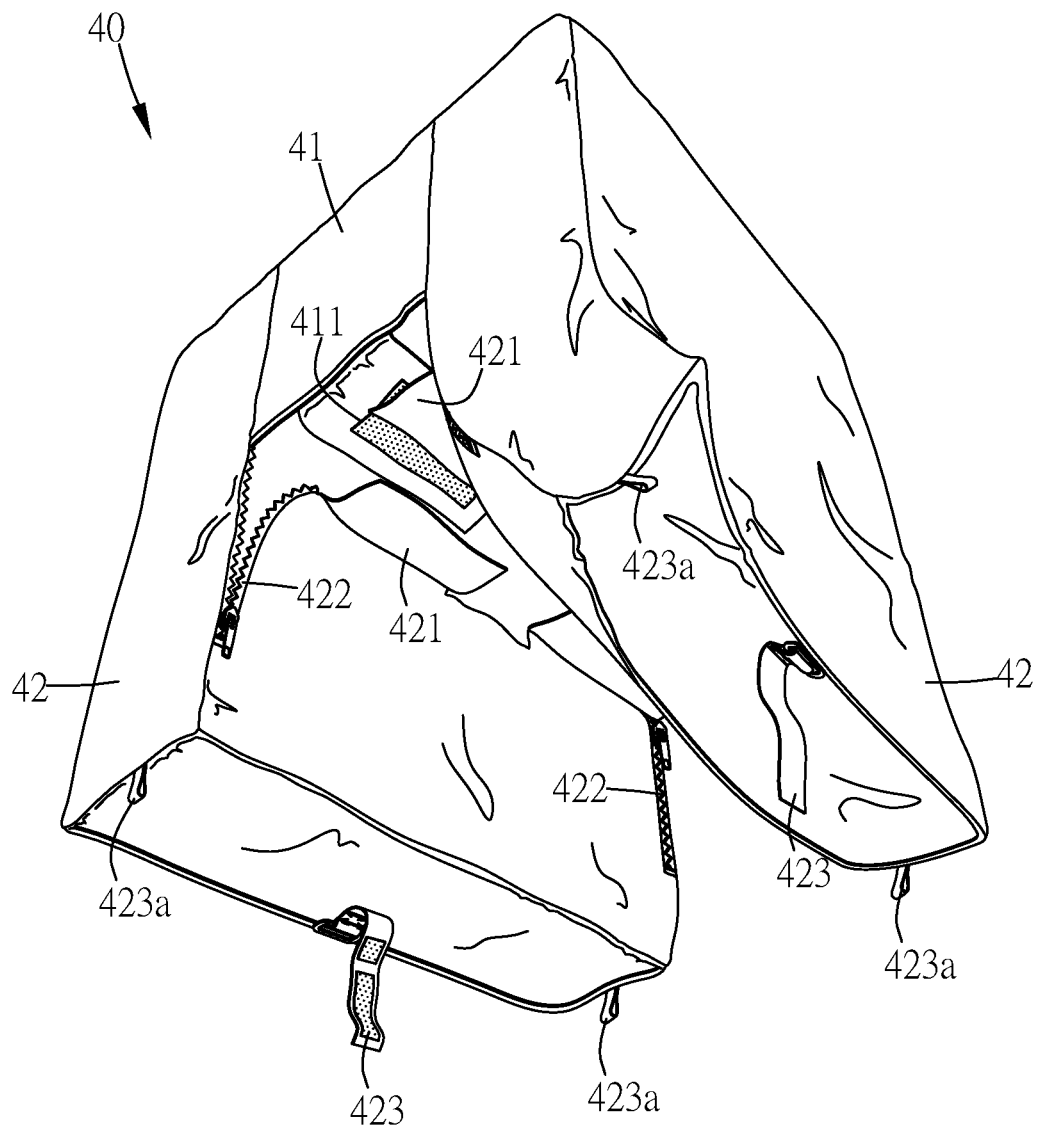
FIG. 8 illustrates a schematic drawing of the storage bag from another angle in the third embodiment of the present invention.
Figure 9:
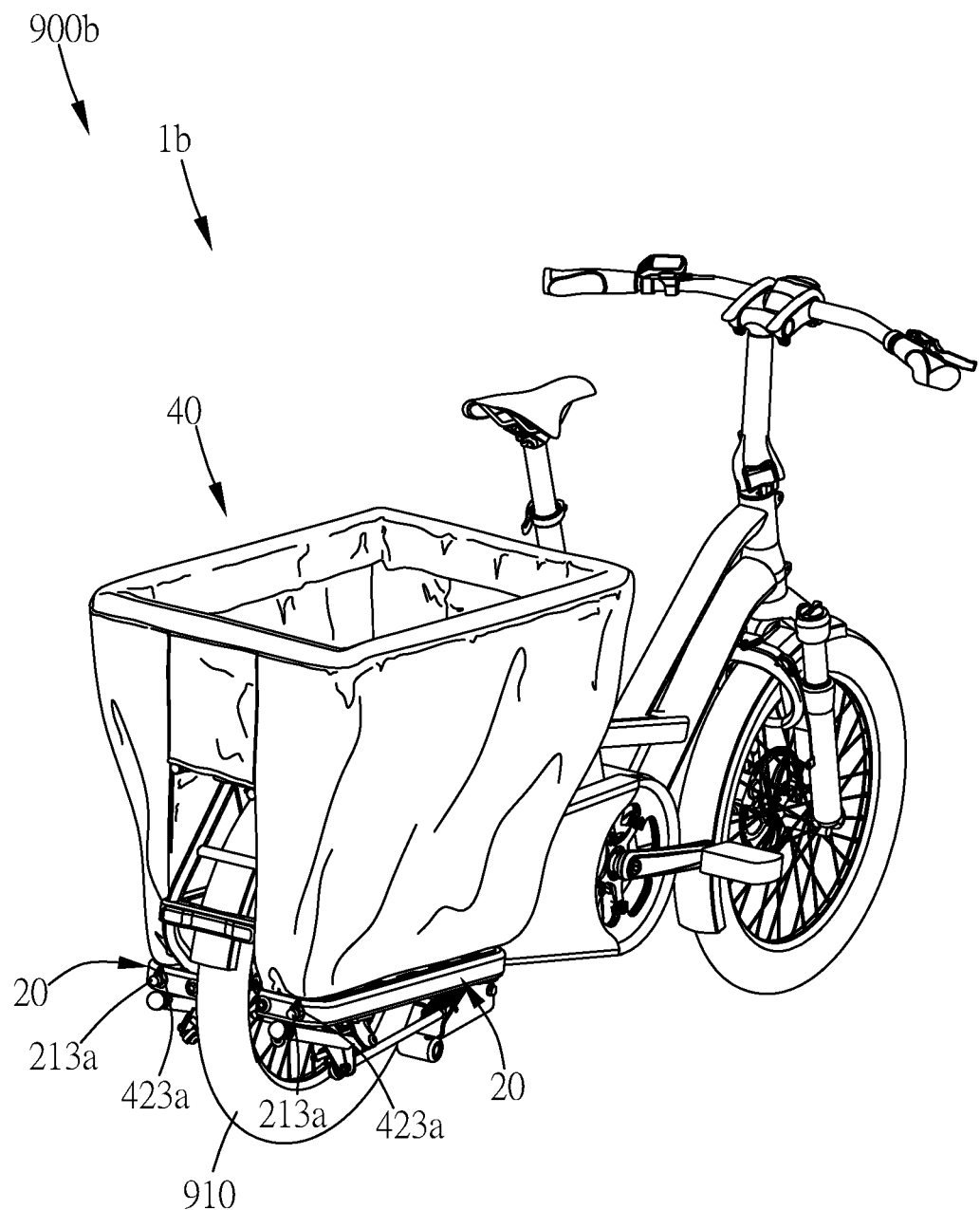
FIG. 9 illustrates a schematic drawing of the bicycle with the storage bag placed on the second supporting platform and the side bag body secured in the third embodiment of the present invention.

Please refer to FIG. 5 to FIG. 9, which illustrate the bicycle and the frame in the third embodiment of the present invention. FIG. 5 illustrates a schematic drawing of the bicycle with the separate storage bag and the second supporting platform in the third embodiment of the present invention. FIG. 6 illustrates a schematic drawing of the bicycle with the storage bag placed on the second supporting platform in the third embodiment of the present invention. FIG. 7 illustrates a schematic drawing of the storage bag in the third embodiment of the present invention. FIG. 8 illustrates a schematic drawing of the storage bag from another angle in the third embodiment of the present invention. FIG. 9 illustrates a schematic drawing of the bicycle with the storage bag placed on the second supporting platform and the side bag body secured in the third embodiment of the present invention.

As shown in FIG. 5 and FIG. 6, the difference between the third embodiment and the first embodiment of the present invention is that, in the frame 1b of the bicycle 900b of the third embodiment, the second supporting platform 30a further includes a storage bag stand 31, and the storage bag stand 31 is presented as a trapezoidal structure. The storage bag stand 31 further includes a top frame 311. The frame 1b further includes a storage bag 40, and the storage bag 40 is used for allowing the user to store an external object. The storage bag 40 includes a top bag body 41 and two side bag bodies 42. The opening of the top bag body 41 can be set with elastic bands such that the opening of the top bag body 41 is stably located on the top frame 311. The two side bag bodies 42 are connected to the top bag body 41, respectively located on the left and right sides of the rear wheel 910, and supported on the two first supporting platforms 20.

As shown in FIG. 5, FIG. 7 and FIG. 8, the top bag body 41 further includes two first connecting sheets 411, and the first connecting sheets 411 are two touch fasteners. The two first connecting sheets 411 are respectively located on two opposite sides of the top bag body 41. The two side bag bodies 42 each include two second connecting sheets 421, and the second connecting sheets 421 are two touch fasteners. The two second connecting sheets 421 of each of the two side bag bodies 42 are respectively towards the two second connecting sheets 421 of the other side bag body 42. One of the second connecting sheets 421 of each of the two side bag bodies 42 is located under one of the first connecting sheets 411, whereby the first connecting sheet 411 and the second connecting sheet 421 of the two side bag bodies 42 below can be combined with each other to form a connecting bag body 43. The connecting bag body 43 is located on the second supporting platform 30a. However, the amounts of the first connecting sheets 411 and the second connecting sheets 421 are not limited to the abovementioned design and can be changed to one or more.

As shown in FIG. 8 and FIG. 9, the two side bag bodies 42 each include two opening parts 422 and a plurality of fastening belts 423, 423a. The two opening parts 422 are respectively located next to the two second connecting sheets 421. The opening part 422 is a zipper for allowing the user to open the inside bottom of the side bag body 42 such that the user can put the trapezoidal structure of the storage bag stand 31 into the storage bag 40 from the opening inside the bottom of the side bag body 42 such that the second supporting platform 30a and the storage bag 40 are combined stably. The plurality of fastening belts 423, 423a are located on the bottom of the side bag body 42. The fastening belt 423 is a belt with a touch fastener for binding the top plate or the side plate of the first supporting platform 20. The fastening belt 423a is a hooking belt, and the fixing part 213a of the second embodiment is a protruding column, and the hooking belt of the fastening belt 423a is used for fastening the protruding column of the fixing part 213a of the side plate of the first supporting platform 20. Therefore, via the plurality of fastening belts 423, 423a, the two side bag bodies 42 can be combined with the first supporting platform 20 stably. However, the amounts of the opening part 422 and the fastening belt 423, 423a are not limited to the abovementioned design and can be changed to one or more. It is to be known that, the design of the storage bag 40 is not limited to the abovementioned description, for example, the size and the shape of the storage bag 40 can be changed according to the requirement.

Via the structure design of the bicycle and the frame of the present invention, the item carrying capacity of the bicycle can be increased greatly. In addition, the user can use a screw and a nut to install additional bicycle accessories onto the frame.

What is claimed is:

1. A bicycle, comprising:
   a rear wheel; and
   a frame, comprising:
      a frame main body, comprising:
         two supporting parts, respectively located on two sides of the rear wheel;
         a bottom frame, located in front of the rear wheel; and
         a surrounding part, located in back of the rear wheel; and
      two first supporting platforms, respectively located on the two sides of the rear wheel, wherein each of the two first supporting platforms comprises:
         a side plate, comprising a front connecting end and a back connecting end, wherein the front connecting end is connected to the bottom frame and the back connecting end is connected to the supporting part located on a same side of the rear wheel; and
         a top plate, connected to a top of the side plate, the top plate comprising a first supporting surface to support an external object.

2. The bicycle as claimed in claim 1, wherein the two first supporting platforms respectively comprises a bottom connecting plate, and the bottom connecting plate is connected to the front connecting end of the side plate of the two first supporting platforms.

3. The bicycle as claimed in claim 2, wherein the two first supporting platforms respectively comprises a connecting block, and the connecting block is connected to the side plate located on a same side of the rear wheel.

4. The bicycle as claimed in claim 3, wherein the bicycle further comprises a kickstand and the top plate further comprises at least one top plate hole; the kickstand is fastened to the at least one top plate hole.

5. The bicycle as claimed in claim 4, wherein the two first supporting platforms respectively comprises an extension supporting plate; the extension supporting plate comprises a fastener; the side plates of the two first supporting platforms respectively comprise a fixing part; the fastener is fastened to the fixing part.

6. The bicycle as claimed in claim 5, wherein the frame further comprises a second supporting platform and a storage bag, and the second supporting platform is located above the rear wheel; the second supporting platform further comprises a storage bag stand, and the storage bag stand further comprises a top frame; the storage bag comprises a top bag body, and the top bag body is located on the top frame.

7. The bicycle as claimed in claim 6, wherein the storage bag further comprises two side bag bodies, and the two side bag bodies are connected to the top bag body, respectively located on the two sides of the rear wheel, and supported on the two first supporting platforms.

8. The bicycle as claimed in claim 7, wherein the top bag body further comprises at least one first connecting sheet; the two side bag bodies each comprise at least one second connecting sheet; the at least one first connecting sheet and the at least one second connecting sheet of the two side bag bodies are combined with each other to form a connecting bag body, and the connecting bag body is located on the second supporting platform.

9. The bicycle as claimed in claim 8, wherein the two side bag bodies respectively comprise an opening part and a fastening belt, the opening part is located next to the at least one second connecting sheet, and the fastening belt is fastened to the first supporting platform.

10. A bicycle, comprising:
a rear wheel; and
a frame, comprising:
  a frame main body, comprising:
    two supporting parts, respectively located on two sides of the rear wheel;
    a bottom frame, located in front of the rear wheel; and
    a surrounding part, located in back of the rear wheel; and
  two first supporting platforms, respectively located on the two sides of the rear wheel, wherein each of the two first supporting platforms comprises:
    a side plate, comprising a front connecting end and a back connecting end and a fixing part, wherein the front connecting end is connected to the bottom frame and the back connecting end is connected to the supporting part located on a same side of the rear wheel;
    a top plate, connected to a top of the side plate, the top plate comprising a first supporting surface to support an external object; and
    an extension supporting plate, comprising a fastener, wherein the fastener is fastened to the fixing part.

11. A bicycle, comprising:
a rear wheel; and
a frame, comprising:
  a frame main body, comprising:
    two supporting parts, respectively located on two sides of the rear wheel;
    a bottom frame, located in front of the rear wheel; and
    a surrounding part, located in back of the rear wheel;
  two first supporting platforms, respectively located on the two sides of the rear wheel, wherein each of the two first supporting platforms comprises:
    a side plate, comprising a front connecting end and a back connecting end, wherein the front connecting end is connected to the bottom frame and the back connecting end is connected to the supporting part located on a same side of the rear wheel; and
    a top plate, connected to a top of the side plate, the top plate comprising a first supporting surface to support an external object;
  a second supporting platform, located above the rear wheel, wherein the second supporting platform comprises a storage bag stand, and the storage bag stand comprises a top frame;
  a storage bag, comprising a top bag body, and the top bag body is located on the top frame.

12. The bicycle as claimed in claim 11, wherein the storage bag further comprises two side bag bodies, and the two side bag bodies are connected to the top bag body, respectively located on the two sides of the rear wheel, and supported on the two first supporting platforms.

13. The bicycle as claimed in claim 12, wherein the top bag body further comprises at least one first connecting sheet; the two side bag bodies each comprise at least one second connecting sheet; the at least one first connecting sheet and the at least one second connecting sheet of the two side bag bodies are combined with each other to form a connecting bag body, and the connecting bag body is located on the second supporting platform.

14. The bicycle as claimed in claim 13, wherein the two side bag bodies respectively comprise an opening part and a fastening belt, the opening part is located next to the at least one second connecting sheet, and the fastening belt is fastened to the first supporting platform.

* * * * *